US012153279B2

(12) United States Patent
Frost et al.

(10) Patent No.: US 12,153,279 B2
(45) Date of Patent: Nov. 26, 2024

(54) LENS ALIGNMENT SYSTEM WITH MULTIPLE DEGREES OF FREEDOM

(71) Applicant: Banner Engineering Corp., Minneapolis, MN (US)

(72) Inventors: Dan Frost, Minneapolis, MN (US); Matt Payne, Minneapolis, MN (US); Ethan Stout, Minneapolis, MN (US)

(73) Assignee: BANNER ENGINEERING CORP., Minneapolis, MN (US)

( * ) Notice: Subject to any disclaimer, the term of this patent is extended or adjusted under 35 U.S.C. 154(b) by 574 days.

(21) Appl. No.: 17/447,905

(22) Filed: Sep. 16, 2021

(65) Prior Publication Data

US 2023/0083301 A1 Mar. 16, 2023

(51) Int. Cl.
*G02B 7/02* (2021.01)
*H04N 23/55* (2023.01)

(52) U.S. Cl.
CPC ............. *G02B 7/023* (2013.01); *H04N 23/55* (2023.01)

(58) Field of Classification Search
CPC ......... G02B 7/023; G02B 7/005; H04N 23/55
USPC ....................................................... 359/819
See application file for complete search history.

(56) References Cited

U.S. PATENT DOCUMENTS

| 6,374,982 | B1 | 4/2002 | Cohen et al. |
| 8,063,975 | B2 | 11/2011 | Butterfield et al. |
| 8,724,944 | B2 | 5/2014 | Kuznia et al. |
| 8,786,713 | B1 | 7/2014 | Tamasanis |
| 9,869,833 | B2 | 1/2018 | Wang et al. |
| 11,025,807 | B1 | 6/2021 | Kuperman et al. |
| 2006/0132644 | A1 | 6/2006 | Shangguan et al. |
| 2009/0180021 | A1 | 7/2009 | Kikuchi et al. |

(Continued)

FOREIGN PATENT DOCUMENTS

| JP | 2004354519 A | 12/2004 |
| JP | 2006308987 A | 11/2006 |

(Continued)

OTHER PUBLICATIONS

Chapter II Demand filed in related International Application No. PCT/US22/74777, dated Apr. 7, 2023, 27 pages.

(Continued)

*Primary Examiner* — William R Alexander
(74) *Attorney, Agent, or Firm* — Thompson Patent Law Offices PC

(57) ABSTRACT

Apparatus and associated methods relate to a lens alignment system having opposing end effectors configured to control a position of a rigid lens body with respect to a plane. In an illustrative example, each of the opposing end effectors may engage a corresponding receptacle on respective opposite faces of the lens body. Each of the end effectors may, for example, frictionally contacts each of the corresponding receptacles within a respective portion of each of at least two contact regions. During the engagement, each of the contact regions may, for example, lie on opposite sides of an axis of rotation that extends between the end effectors. In response to at least a predetermined minimum net moment applied to the lens body, the lens body may, for example, be rotatable about the axis of rotation. Various embodiments may advantageously enable precise and/or rapid positioning of the lens body in the plane.

20 Claims, 16 Drawing Sheets

(56) References Cited

U.S. PATENT DOCUMENTS

| | | | |
|---|---|---|---|
| 2017/0052385 A1 | 2/2017 | Wu et al. | |
| 2018/0007246 A1* | 1/2018 | Shigemitsu | H04N 23/55 |
| 2019/0152721 A1 | 5/2019 | Xu et al. | |
| 2020/0068719 A1 | 2/2020 | Bando et al. | |
| 2020/0142150 A1 | 5/2020 | Chou | |
| 2022/0099919 A1* | 3/2022 | Lee | H04N 23/68 |
| 2022/0159155 A1* | 5/2022 | Im | G02B 7/102 |
| 2023/0384556 A1* | 11/2023 | Kim | H02K 11/35 |

FOREIGN PATENT DOCUMENTS

| | | |
|---|---|---|
| KR | 101724678 B1 | 4/2017 |
| WO | 2006028183 A1 | 3/2006 |
| WO | 2019138589 A1 | 7/2019 |

OTHER PUBLICATIONS

Turner, et al., "Active Alignment Techniques Improve Lens Centering," Photonics Spectra, Dec. 2014, retrieved from the internet Jul. 27, 2021, <https://www.photonics.com/Articles/Active_Alignment_Techniques_Improve_Lens_Centering/a56965>.

Written Opinion of the International Preliminary Examining Authority in related International Application No. PCT/US2022/074777, dated May 16, 2023, 8 pages.

International Search Report and Written Opinion of the International Searching Authority in related International Application No. PCT/US2022/074777, dated Nov. 30, 2022, 12 pages.

Written Opinion of the International Preliminary Examining Authority in related International Application No. PCT/US2022/074777, dated Dec. 8, 2023, 29 pages.

* cited by examiner

LENS ALIGNMENT SYSTEM WITH MULTIPLE DEGREES OF FREEDOM

TECHNICAL FIELD

Various embodiments relate generally to lens alignment.

BACKGROUND

Sensors may include receivers. Sensors may include emitters. In some sensors, a receiver may receive a reflection of a signal emitted by an emitter. The emitter may, for example, emit an electromagnetic signal. The electromagnetic signal may, for example, include an optical signal. The receiver may, for example, generate detection signal(s) in response to receiving an electromagnetic signal. The electromagnetic signal may, for example, include an optical signal. The receiver may, for example, include a photoelectric detector. In some sensors, a receiver may include a photoelectric detection array.

A sensor may be at least partially disposed in a housing. The housing may, for example, provide protection to components of the sensor. For example, the housing may protect an emitter and/or receiver of the sensor. In some sensors, the housing may be two pieces. At least one piece of the housing may, for example, be optically translucent.

SUMMARY

Apparatus and associated methods relate to a lens alignment system having opposing end effectors configured to control a position of a rigid lens body with respect to a plane. In an illustrative example, each of the opposing end effectors may engage a corresponding receptacle on respective opposite faces of the lens body. Each of the end effectors may, for example, frictionally contact each of the corresponding receptacles within a respective portion of each of at least two contact regions. During the engagement, each of the contact regions may, for example, lie on opposite sides of an axis of rotation that extends between the end effectors. In response to at least a predetermined minimum net moment applied to the lens body, the lens body may, for example, be rotatable about the axis of rotation. Various embodiments may advantageously enable precise and/or rapid positioning of the lens body in the plane.

Various embodiments may achieve one or more advantages. For example, some embodiments may advantageously rotate to accommodate variations in a lens body and/or housing. In some embodiments a lens body may advantageously float in an axis substantially orthogonal to the positioning plane in response to interaction between an engagement surface of the lens body and a receiving surface of a housing. In various embodiments one or more degrees of freedom (e.g., rotational, linear) may advantageously enable a lens body to self-adjust to a housing without requiring additional controlled axes.

Various embodiments may, for example, limit a force of friction between the engagement surface and the receiving surface. Accordingly, some such embodiments may, for example, advantageously enable precise positioning of the lens body relative to the housing with a translation operation directly to a commanded position. For example, various such embodiments may advantageously reduce or eliminate positioning inaccuracies (e.g., above a predetermined acceptable error threshold) due to significant shear forces between the engagement surface and the receiving surface. Various embodiments may advantageously reduce or eliminate the need to 'overdrive' the lens body relative to a desired position. Various embodiments may advantageously reduce or eliminate the need for a 'rough' positioning operation followed by a 'fine' positioning operation.

Various embodiments may advantageously reduce labor requirements. For example, complimenting engagement surfaces configured to auto-align the lens body along an axis may advantageously reduce or eliminate requirements of an operator biasing a lens body to a specific corner. Various embodiments may advantageously eliminate a requirement of force feedback to avoid overdriving an alignment machine. Some embodiments may advantageously reduce uncertainty in a measuring system (e.g., of a position of the lens body relative to a mounting surface). Various embodiments may advantageously increase speed of alignment of a lens body relative to a mounting surface (e.g., of a housing).

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a lens alignment system (LAS) is introduced with reference to FIGS. 1-4. Second, that introduction leads into a description with reference to FIGS. 5-8 of some exemplary geometry relating to an end effector and lens body of the LAS. Third, with reference to FIGS. 9A-9G, an exemplary end effector is disclosed. Fourth, with reference to FIGS. 10A-10G the discussion turns to an exemplary lens body. Finally, the document discusses further embodiments, exemplary applications and aspects relating to lens alignment systems.

Figure 1:
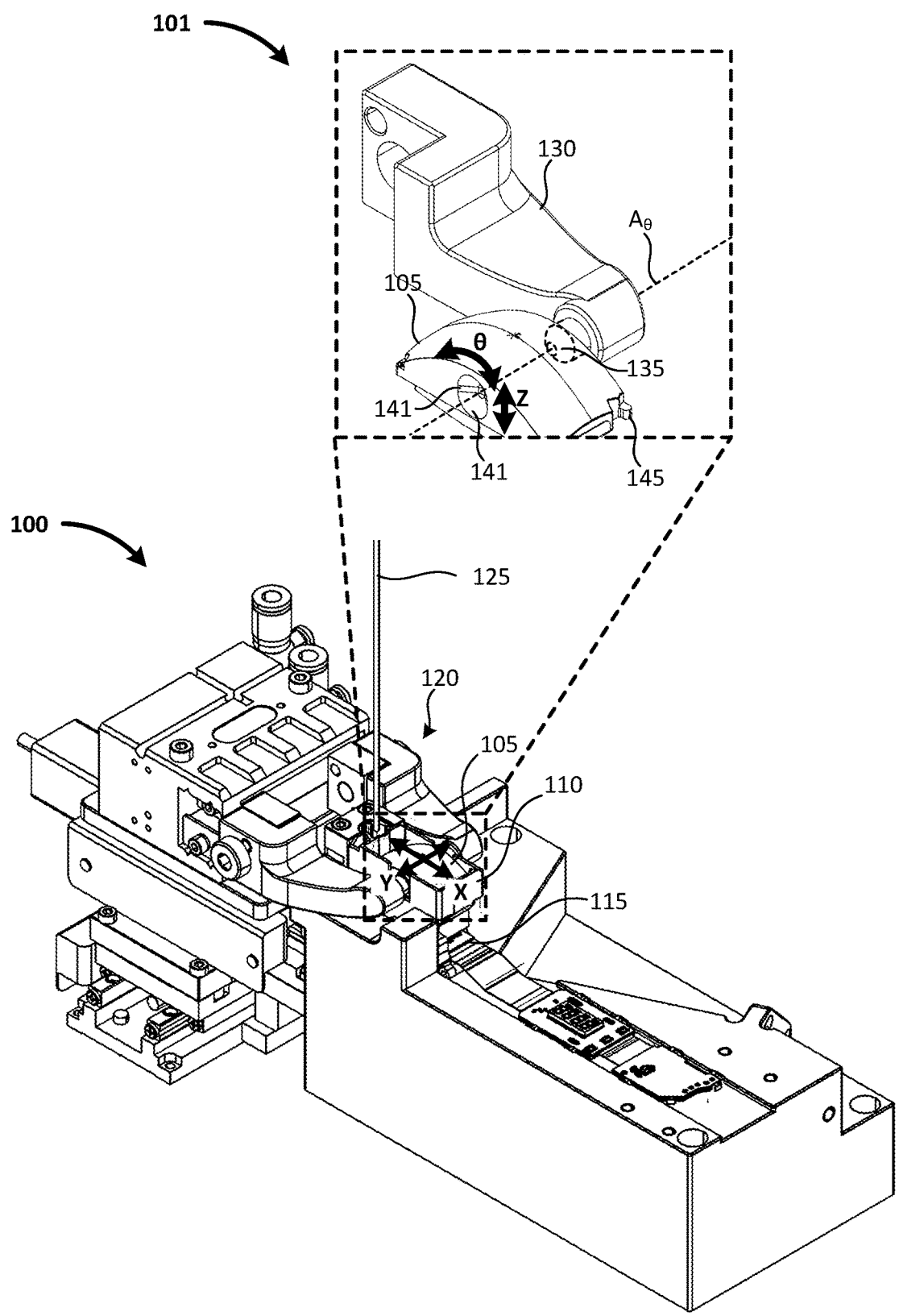
FIG. 1 depicts an exemplary lens alignment system (LAS) employed in an illustrative use-case scenario.
Figure 2A:
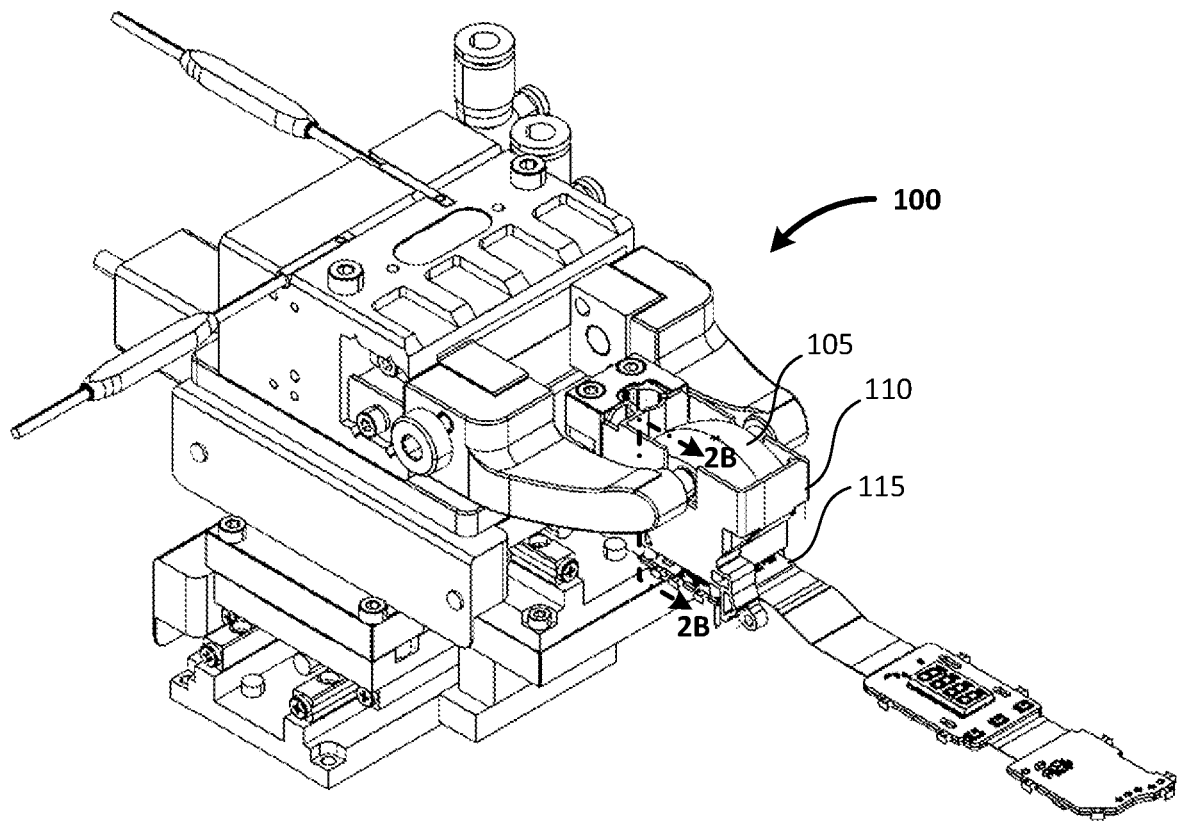
FIG. 2A depicts a closeup view of the LAS in the illustrative use-case scenario.
Figure 2B:
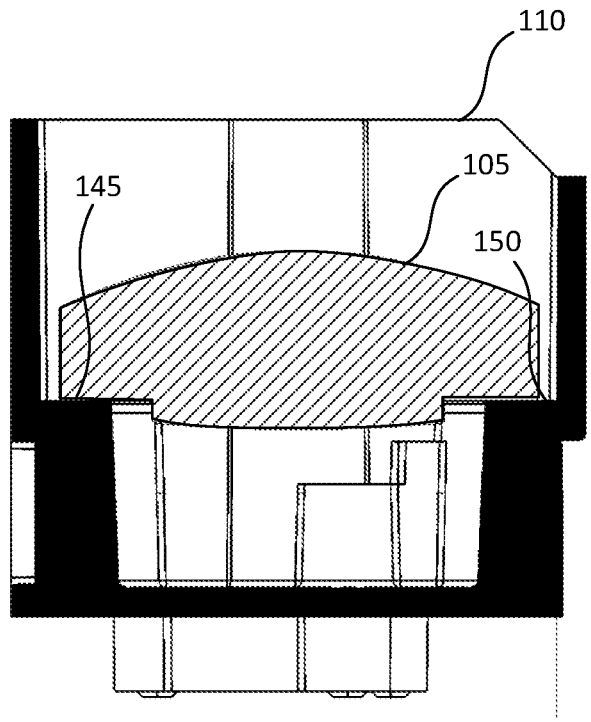
FIG. 2B depicts a cross-section view of an exemplary lens body in an exemplary housing.
Figure 3:
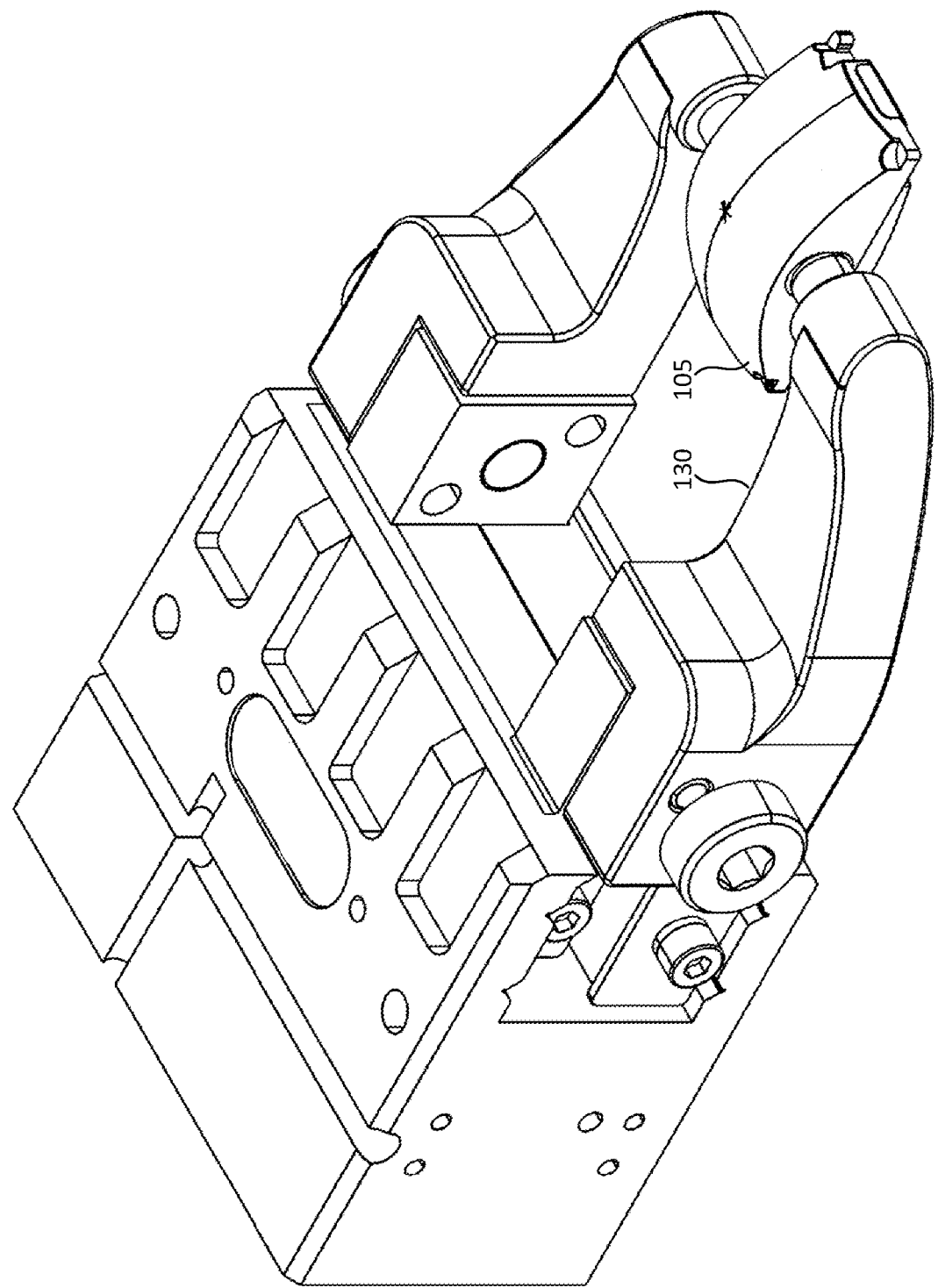
FIG. 3 depicts the exemplary LAS in an isolated view including exemplary end effectors mounted to an actuator module and engaging the lens body.
Figure 4:
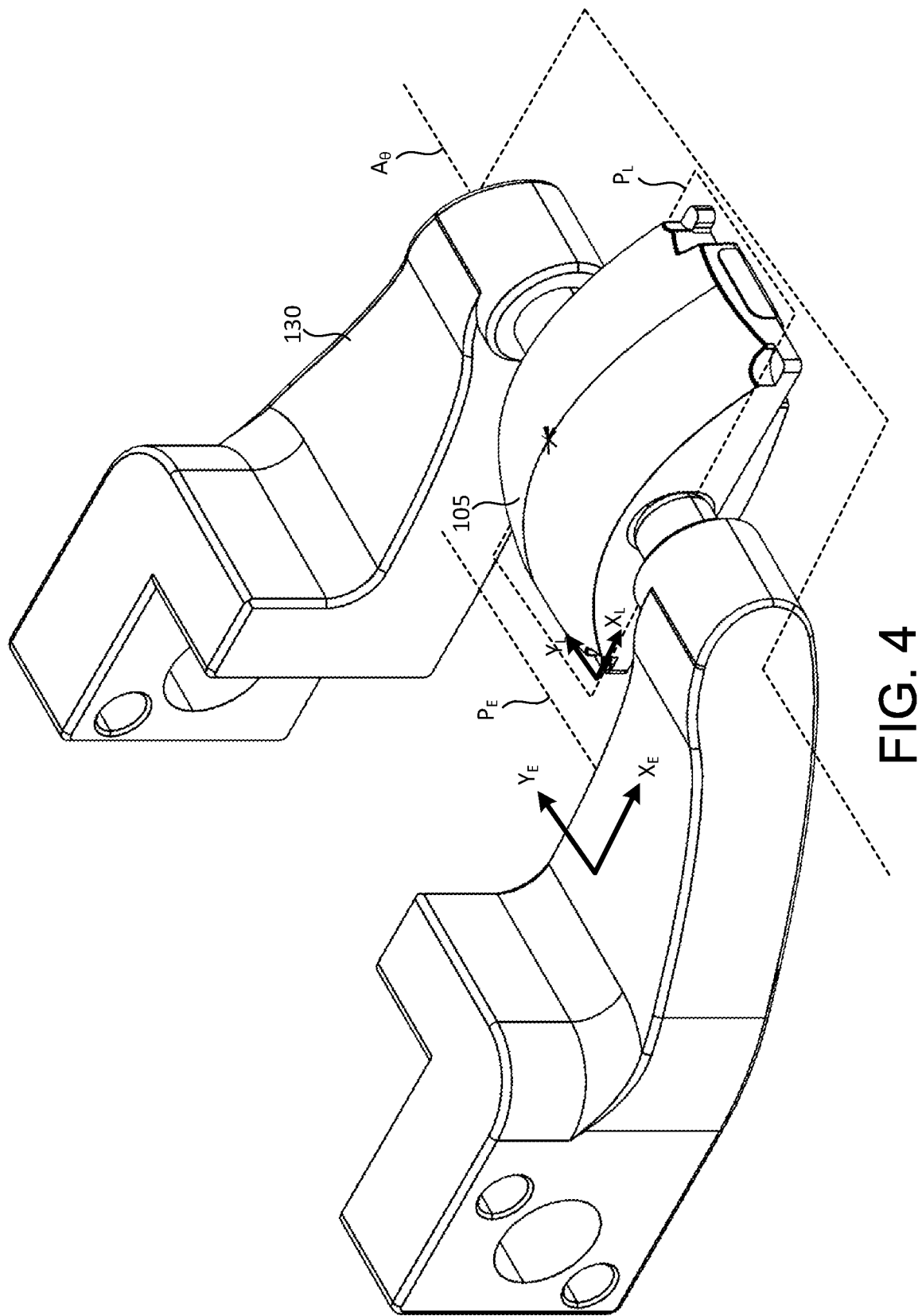
FIG. 4 depicts the exemplary end effectors engaging the lens body.

FIG. 1 depicts an exemplary lens alignment system (LAS) employed in an illustrative use-case scenario. FIG. 2A depicts a closeup view of the LAS in the illustrative use-case scenario. FIG. 2B depicts a cross-section view of an exemplary lens body in an exemplary housing. FIG. 3 depicts the exemplary LAS in an isolated view including exemplary end effectors mounted to an actuator module and engaging the lens body. FIG. 4 depicts the exemplary end effectors engaging the lens body.

In an exemplary assembly scenario 100, a lens body 105 is disposed within a housing 110 for positioning to align with a sensing circuit 115. The lens body 105 is releasably engaged by an alignment system 120. The alignment system 120 may translate the lens body 105 in a first plane. As depicted, the first plane may be defined by two orthogonal axes substantially parallel to the sensing circuit 115. A lateral axis may be a Y axis, as depicted. A longitudinal axis may be a longitudinal axis, as depicted. For example, the alignment system 120 may position the lens body 105 in the housing 110 to optically align the lens body 105 with (at least one target of) the sensing circuit 115. In the depicted example, a laser beam 125 may, for example, be used to align the housing 110 with the sensing circuit 115.

As depicted in an exemplary closeup view 101, the alignment system 120 includes opposing end effectors 130. Each end effector is provided with a distal engagement surface 135. When the opposing end effectors 130 are operated towards each other along the X axis, the respective distal engagement surfaces 135 engage corresponding receiver receptacles 140 in opposing faces of the lens body 105. Each of the corresponding receiver receptacles 140 is provided with an engagement surface 141. Accordingly, the alignment system 120 may operate the opposing end effectors 130 to position the lens body 105 in the first plane (e.g., the X-Y plane).

The engagement between the distal engagement surface 135 and the corresponding engagement surface 141 of the corresponding receiver receptacles 140 may be configured such that the lens body 105 may rotate about an axis ($A_\theta$) parallel to the Y axis. Accordingly, the lens body 105 may advantageously rotate to accommodate variations (e.g., manufacturing variations) between an engagement surface 145 of the lens body 105 and a receiving surface 150 of the housing 110 (e.g., as depicted at least in FIG. 2B).

The engagement between the distal engagement surface 135 and the corresponding receiver receptacles 140 may be configured such that the lens body 105 may float relative to the distal engagement surface 135 in an axis (Z) substantially orthogonal to the first plane. The lens body 105 may advantageously move up and down in the Z axis relative to the distal engagement surface 135 in response to interaction between the engagement surface 145 and the receiving surface 150.

Accordingly, the lens body 105 may adjust in the Z axis to accommodate variations (e.g., manufacturing variations) between the engagement surface 145 of the lens body 105 and the receiving surface of the housing 110. For example, the lens body 105 may translate up and down based on height variations. The lens body 105 may, for example, rotate about an axis parallel to the X axis by allowing the opposing sides (in the Y axis direction) to independently move up and/or down in the Z axis direction to accommodate variations in flatness of the engagement surface 145 and/or the receiving surface 150. The rotation may, for example, be induced by interaction between the engagement surface 145 and the receiving surface 150 inducing a moment about an axis of rotation above a (predetermined) minimum net moment. The (predetermined) minimum net moment may, for example, be determined by a (limited) frictional force between the distal engagement surfaces 135 and the engagement surfaces 141 of the lens body 105.

In various embodiments one or more degrees of freedom (θ, Z) may advantageously enable the lens body 105 to self-adjust to the housing 110 without requiring additional controlled axes. For example, some embodiments may be configured such that the distal engagement surface 135 engage the corresponding receiver receptacles 140 with a limited force. A force of friction between the distal engagement surface 135 and the corresponding receiver receptacles 140 may, for example, be limited to a (predetermined) maximum value. For example, an axial engagement force (e.g., in the Y axis direction) between the distal engagement surface 135 and the corresponding engagement surface 141 may be limited to a (predetermined) maximum value. Accordingly, a force of friction between the engagement surface 145 and the receiving surface 150 may, for example, be advantageously limited to a (predetermined) maximum value.

The limited force of friction between the engagement surface 145 and the receiving surface 150 may, for example, advantageously enable precise positioning of the lens body 105 relative to the housing 110 with a translation operation directly to a commanded position. For example, various such embodiments may advantageously reduce or eliminate positioning inaccuracies (e.g., above a predetermined acceptable error threshold) due to significant shear forces between the engagement surface 145 and the receiving surface 150, which forces may inhibit motion to a commanded position. Various embodiments may advantageously reduce or eliminate the need to 'overdrive' the lens body 105 relative to a desired position. Various embodiments may advantageously reduce or eliminate the need for a 'rough' positioning operation followed by a 'fine' positioning operation.

As depicted in FIG. 4, the distal engagement surfaces 135 of the opposing end effectors 130 are centered around the axis $A_\theta$. The axis $A_\theta$ lies in an effector plane $P_E$ defined by a (longitudinal) axis $X_E$ and a (lateral) axis $Y_E$. The opposing end effectors 130 may be configured to position the lens body 105 in the plane $P_E$.

The lens body 105 lies in a lens plane $P_L$ defined by a (longitudinal) axis XL and a (lateral) axis $Y_L$. When the distal engagement surfaces 135 engage the corresponding engagement surfaces 141, each of the corresponding receiver receptacles 140 may be substantially centered about the axis $A_\theta$. When the distal engagement surfaces 135 engage the corresponding engagement surfaces 141, and the lens body 105 is aligned with a receiving surface (e.g., of the housing 110) the plane $P_E$ and the plane $P_L$ may, for example, be coplanar or substantially coplanar (e.g., within a range of freedom defined by a height of the corresponding engagement surface 141 relative to the distal engagement surface 135).

Figure 5:
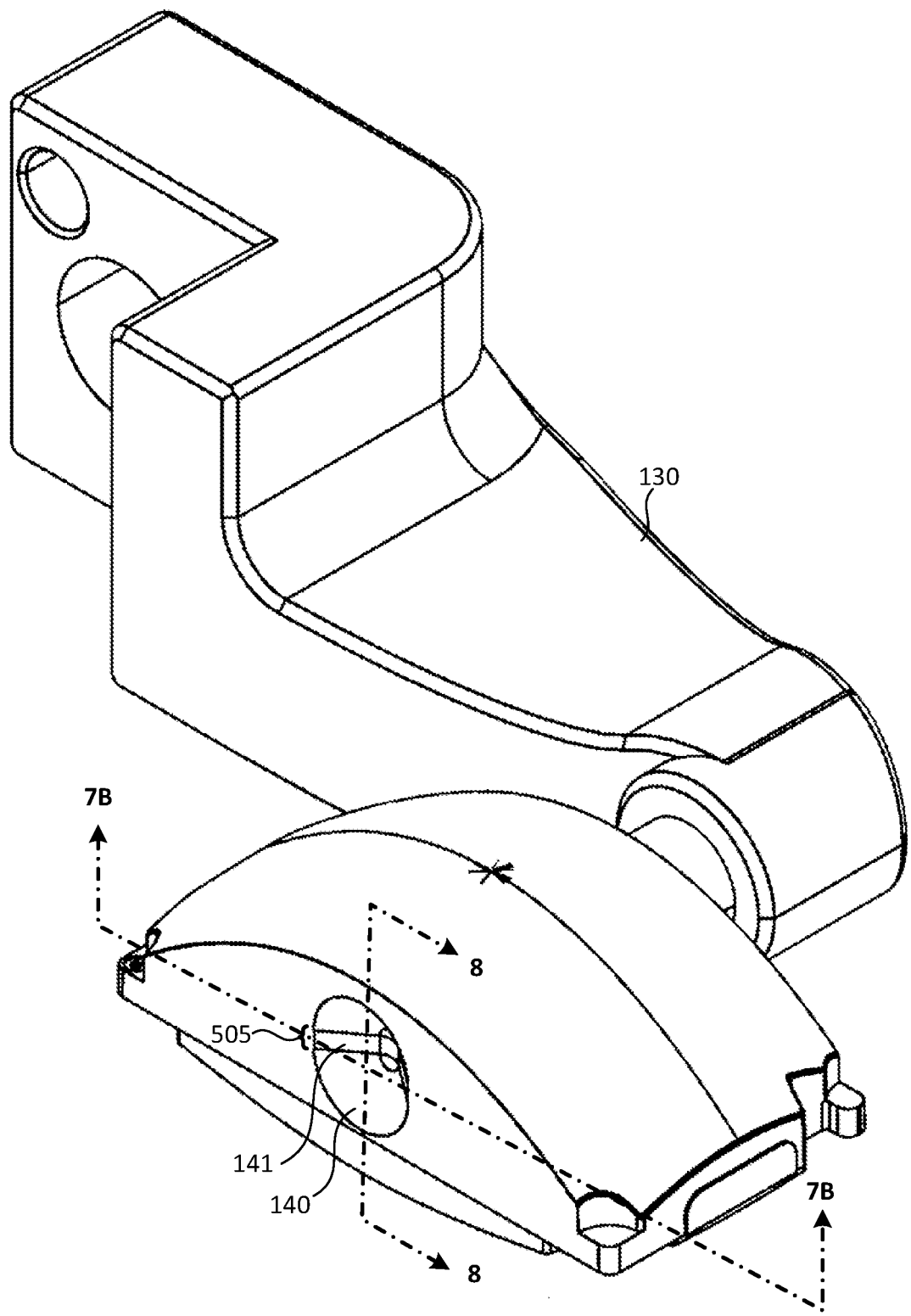
FIG. 5 and FIG. 6 depict closeups views of the isolated configuration depicted in FIG. 4 with one of the end effectors removed to view a corresponding receiver receptacle.
Figure 6:
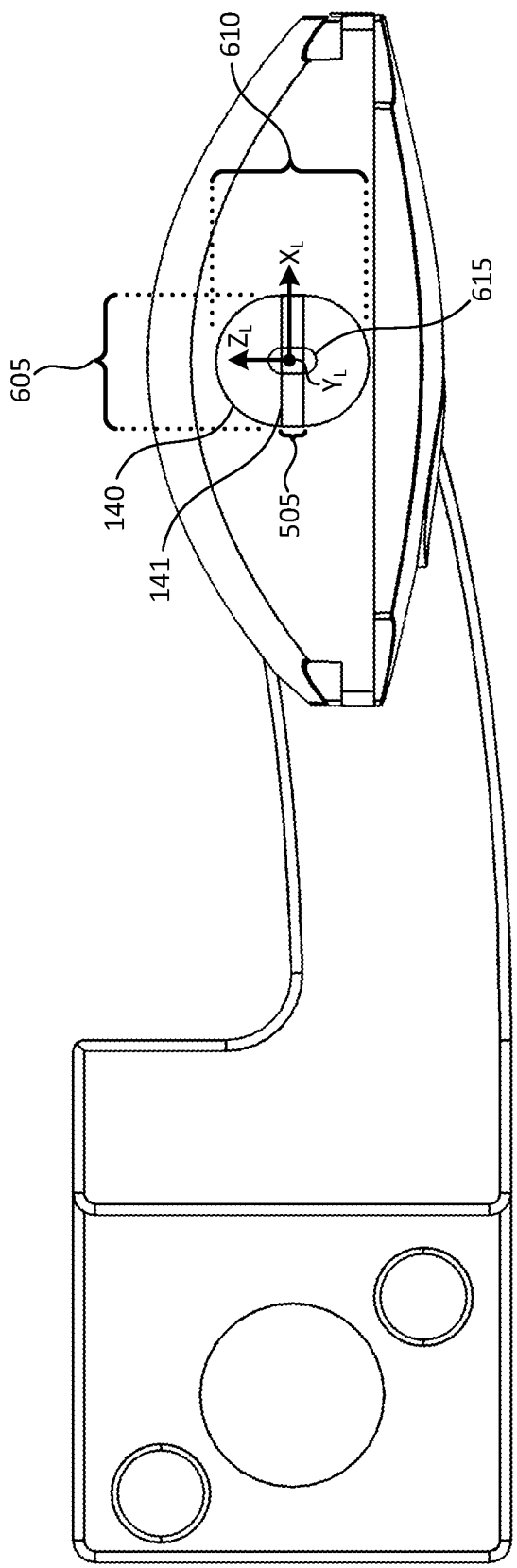
Figure 7A:
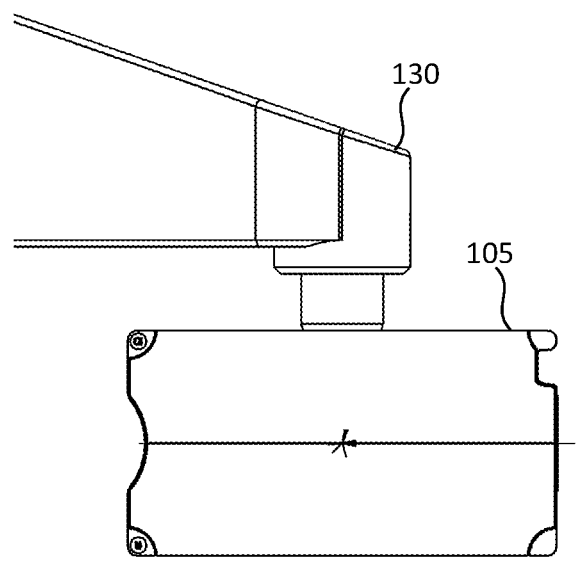
FIG. 7A depicts a top view and FIG. 7B and FIG. 8 depict cross-section views of the configuration depicted in FIG. 5.
Figure 7B:
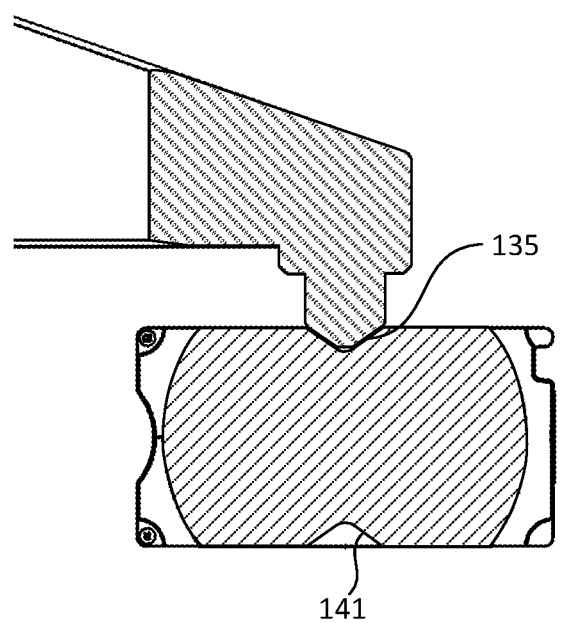
Figure 8:
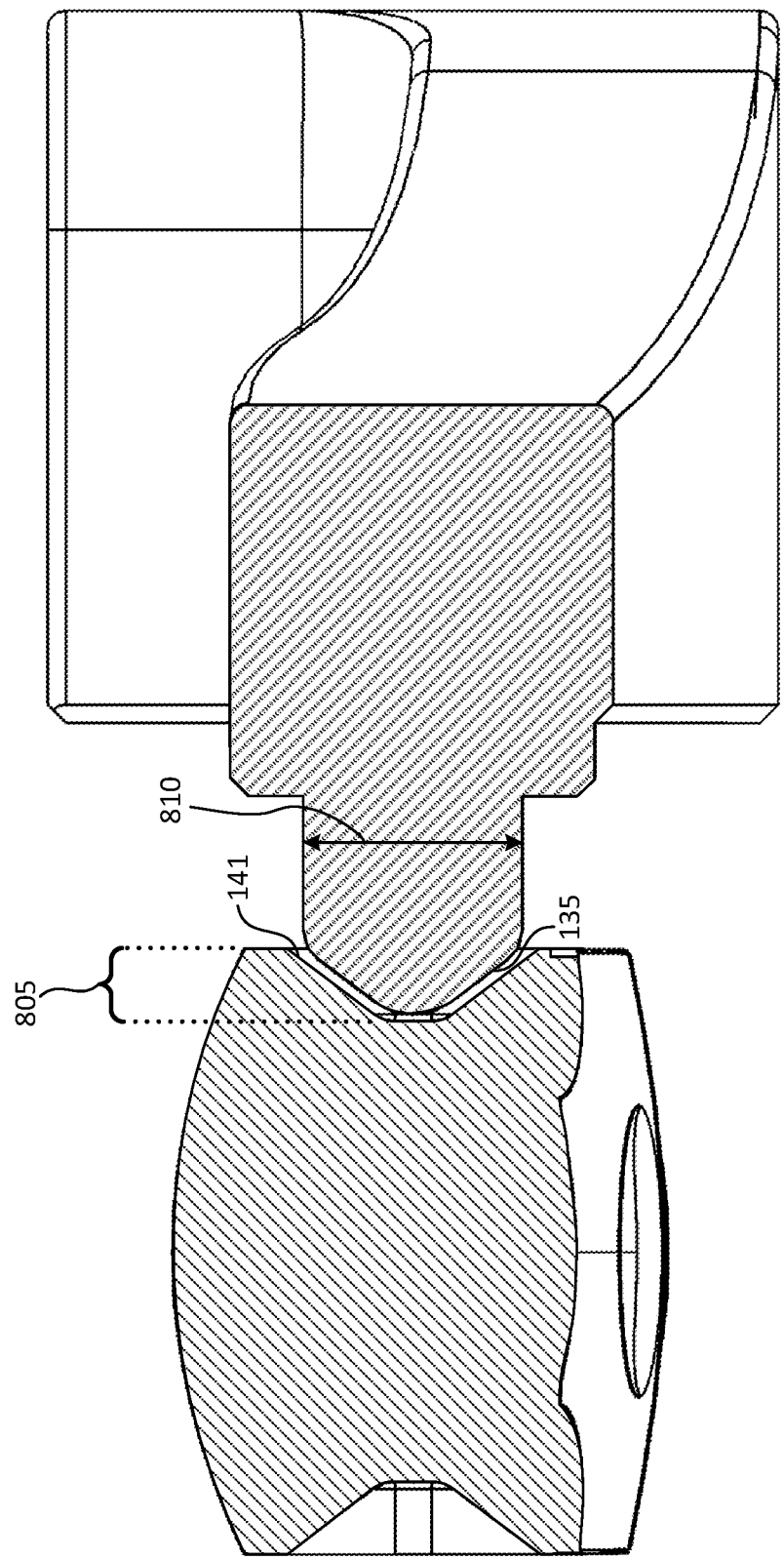
Figure 9A:
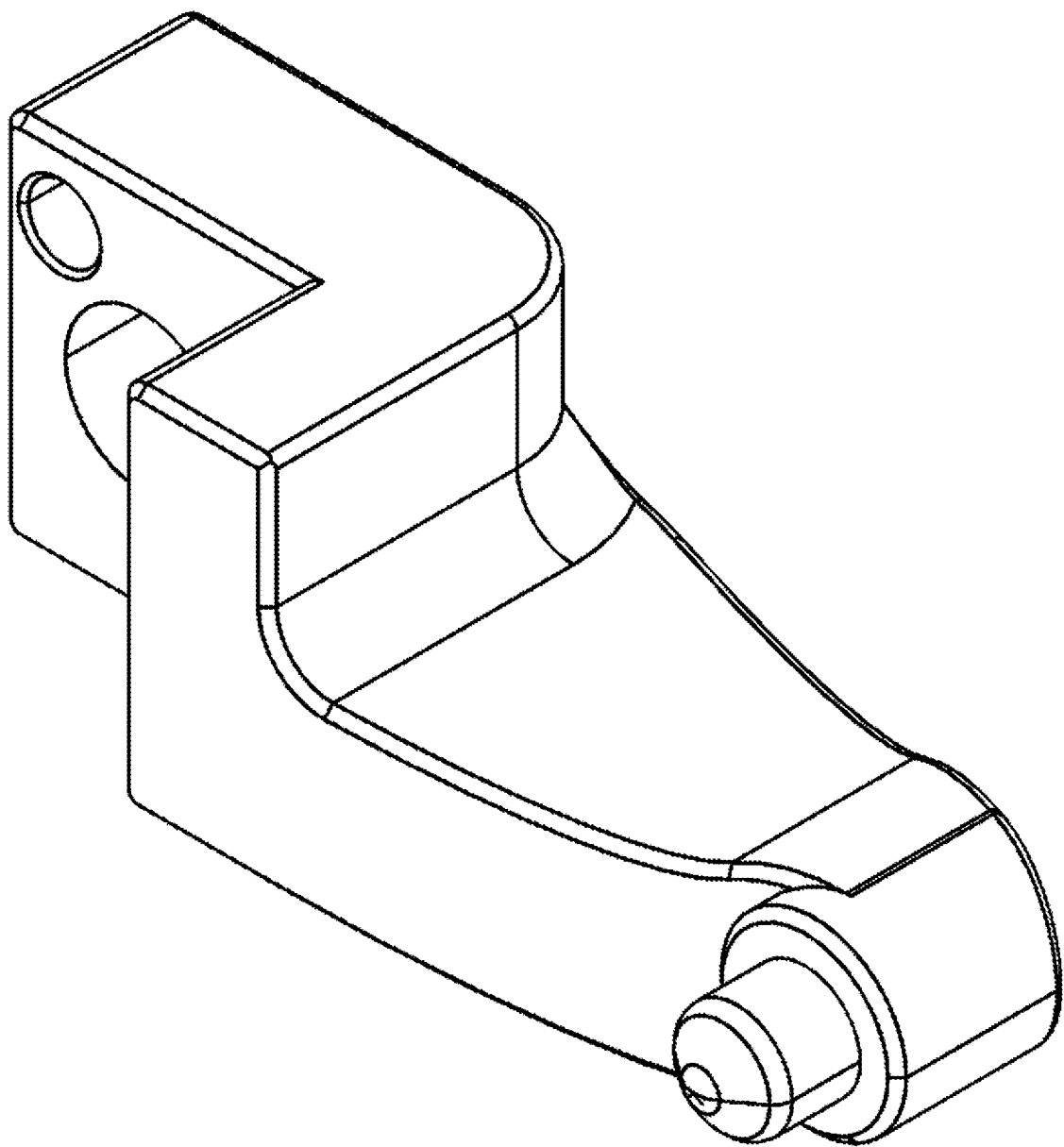
FIG. 9A, FIG. 9B, FIG. 9C, FIG. 9D, FIG. 9E, FIG. 9F, and FIG. 9G depict an exemplary end effector.
Figure 9B:
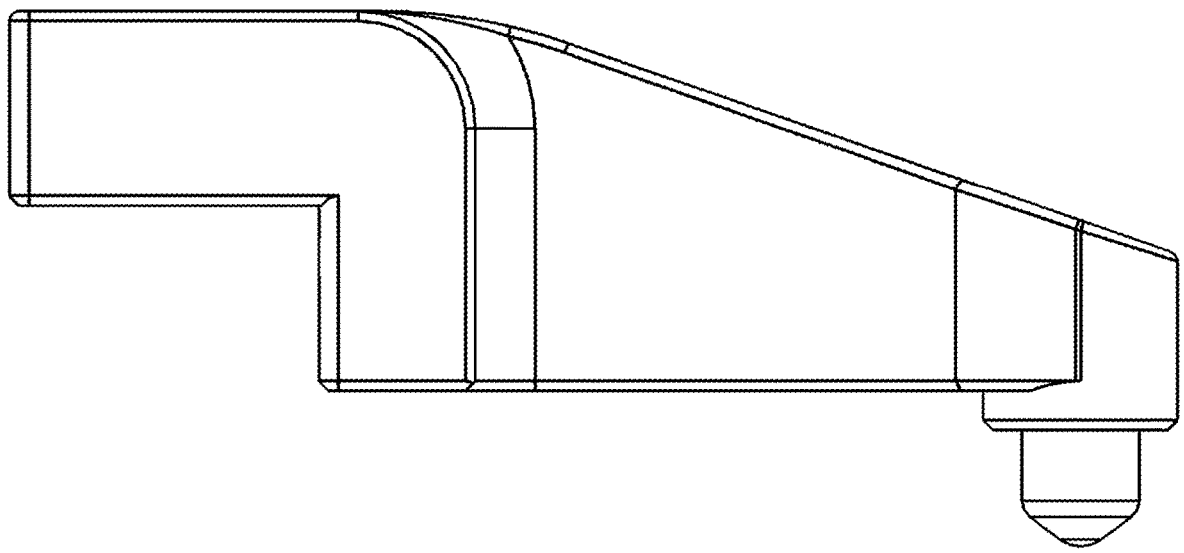
Figure 9C:
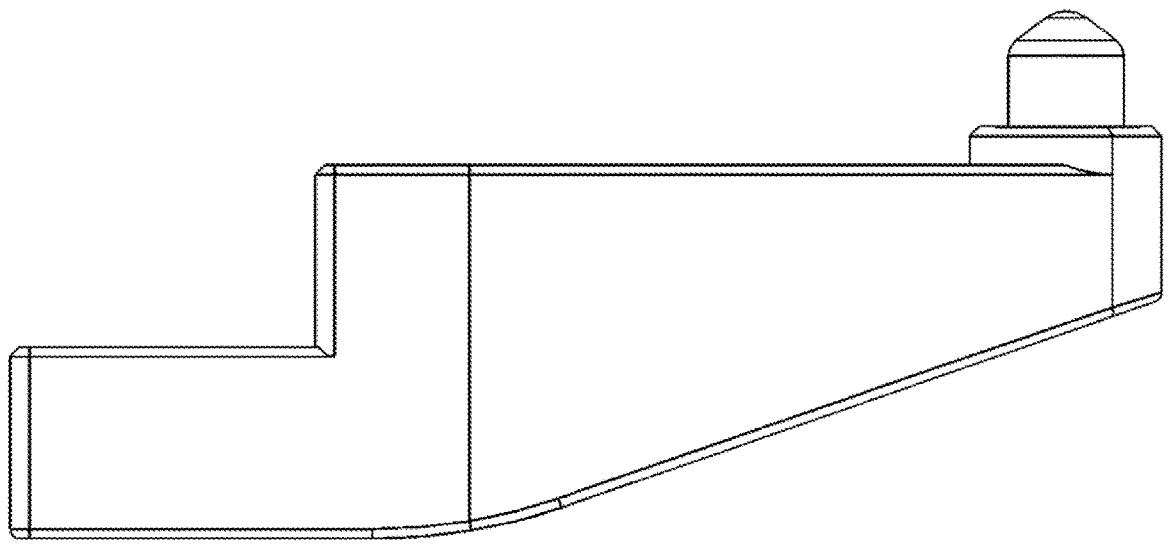
Figure 9D:
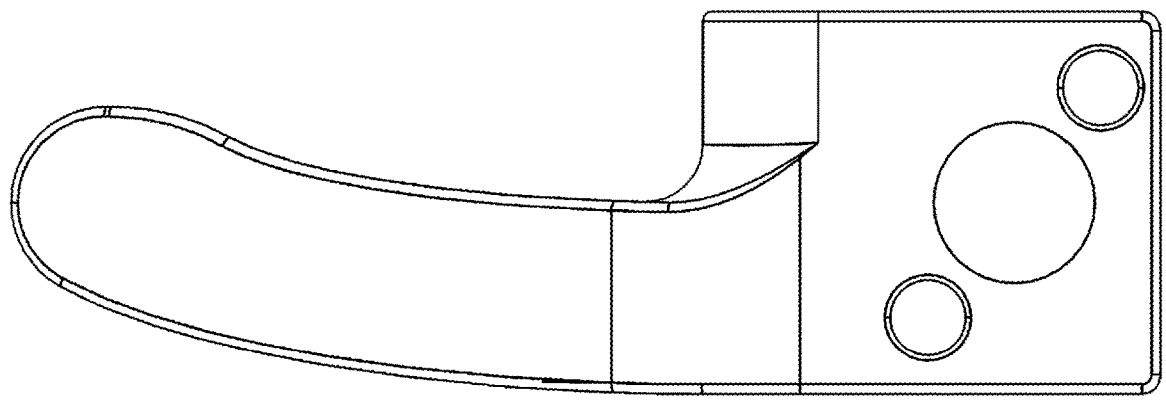
Figure 9E:
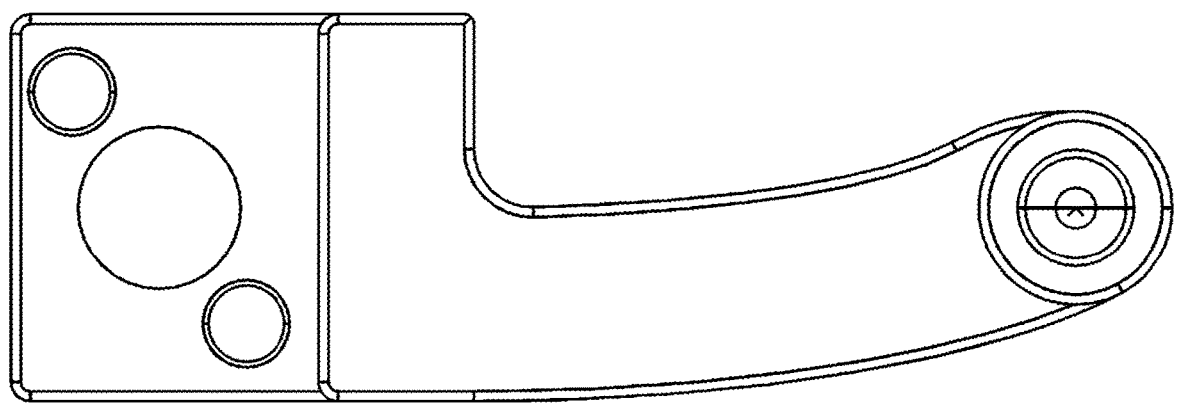
Figure 9F:
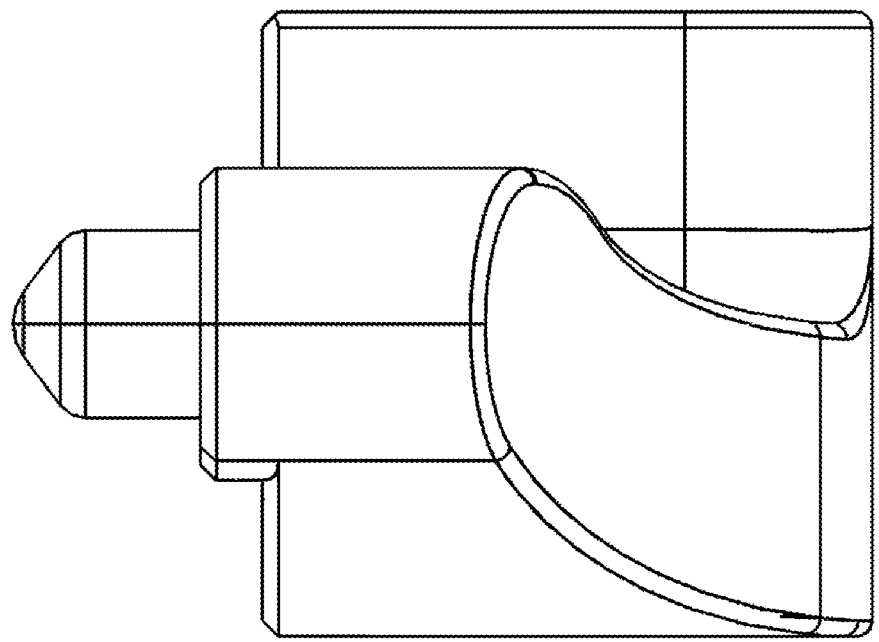
Figure 9G:
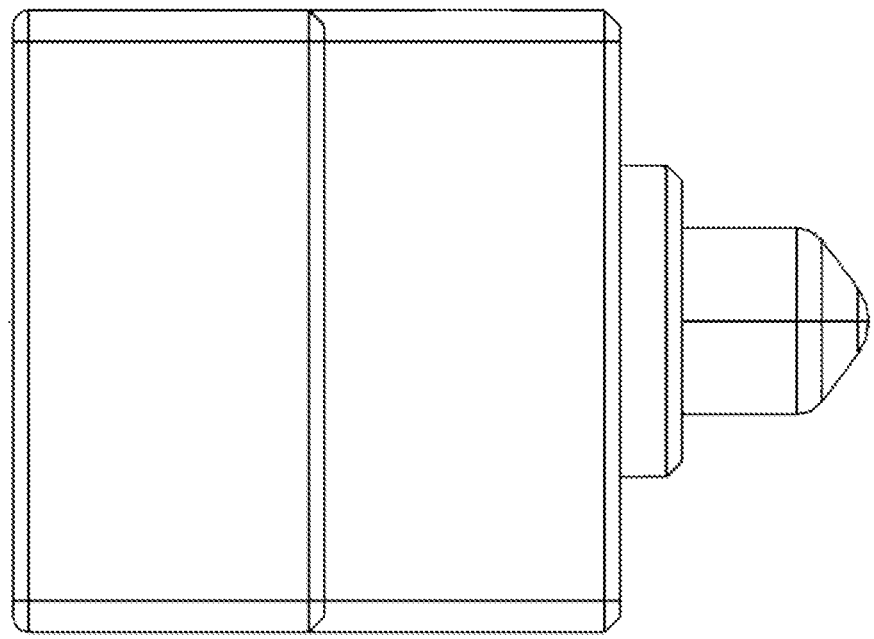
Figure 10A:
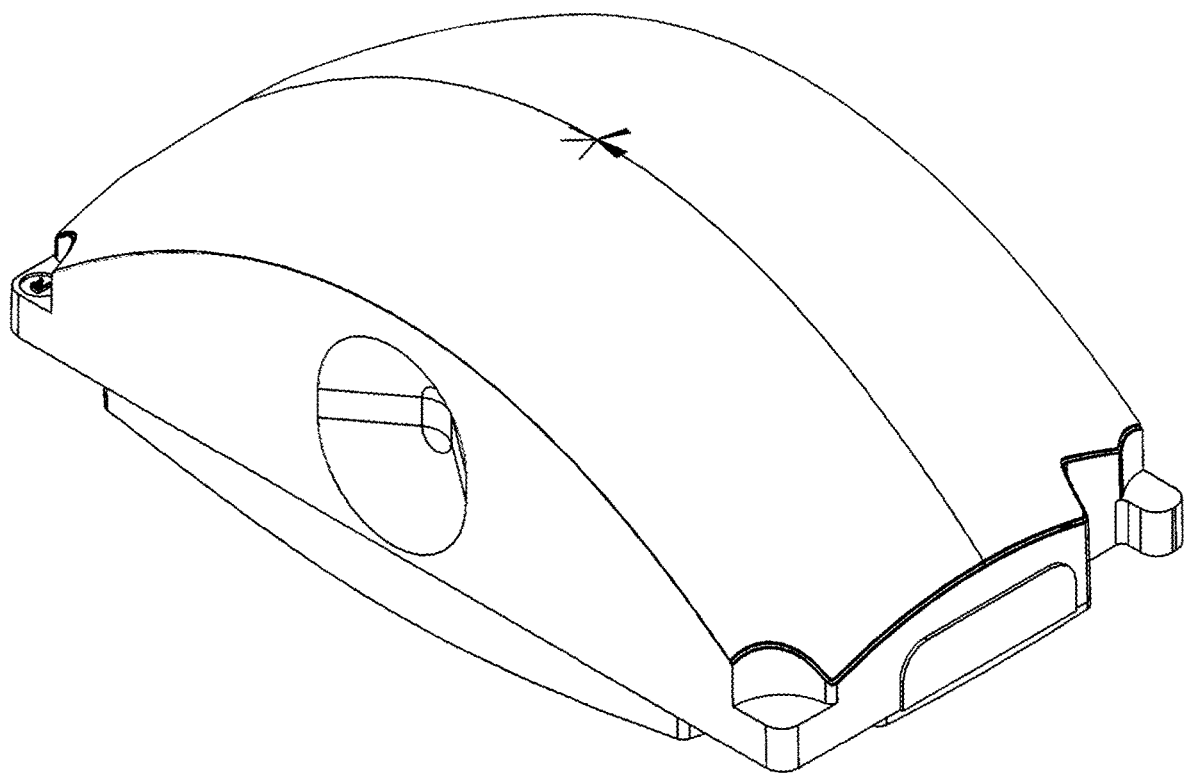
FIG. 10A, FIG. 10B, FIG. 10C, FIG. 10D, FIG. 10E, FIG. 10F, and FIG. 10G depict an exemplary lens body.
Figure 10B:
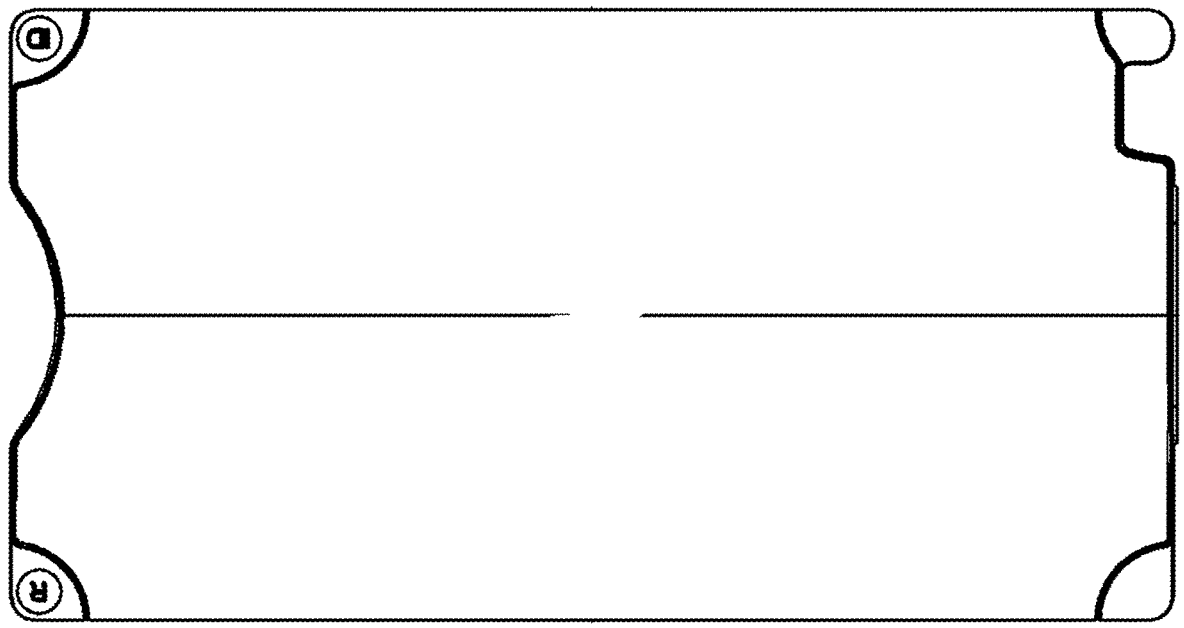
Figure 10C:
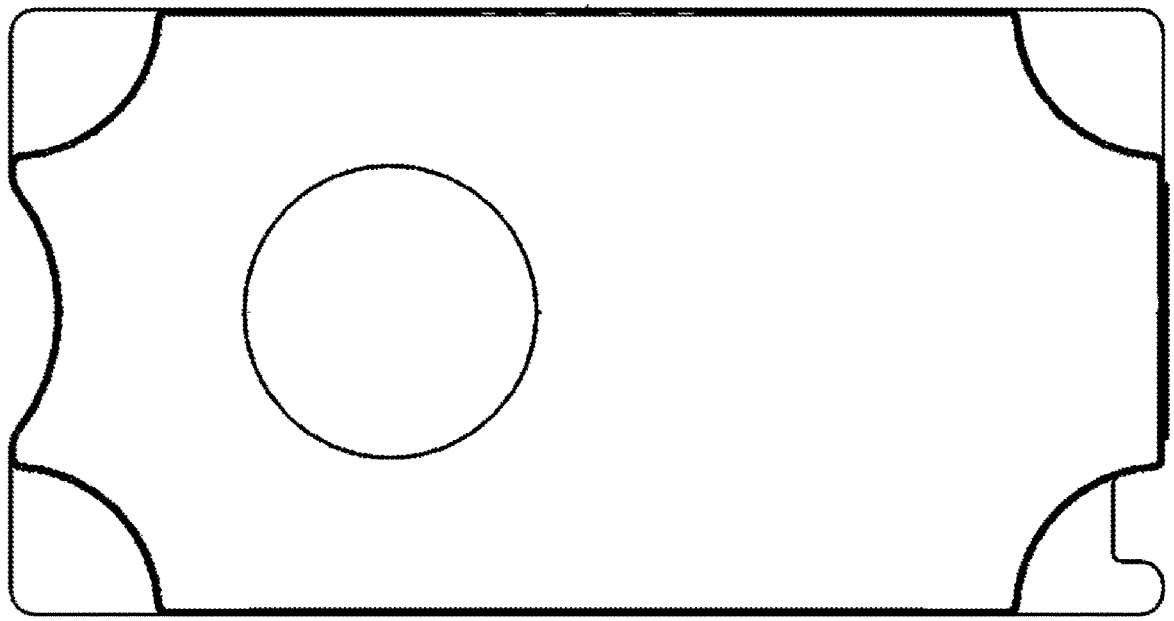
Figure 10D:
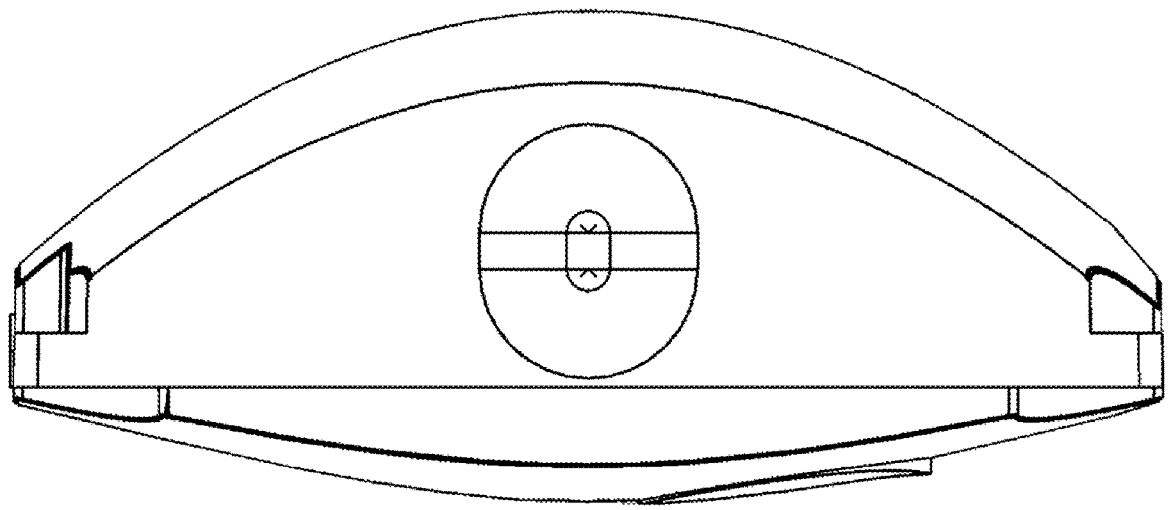
Figure 10E:
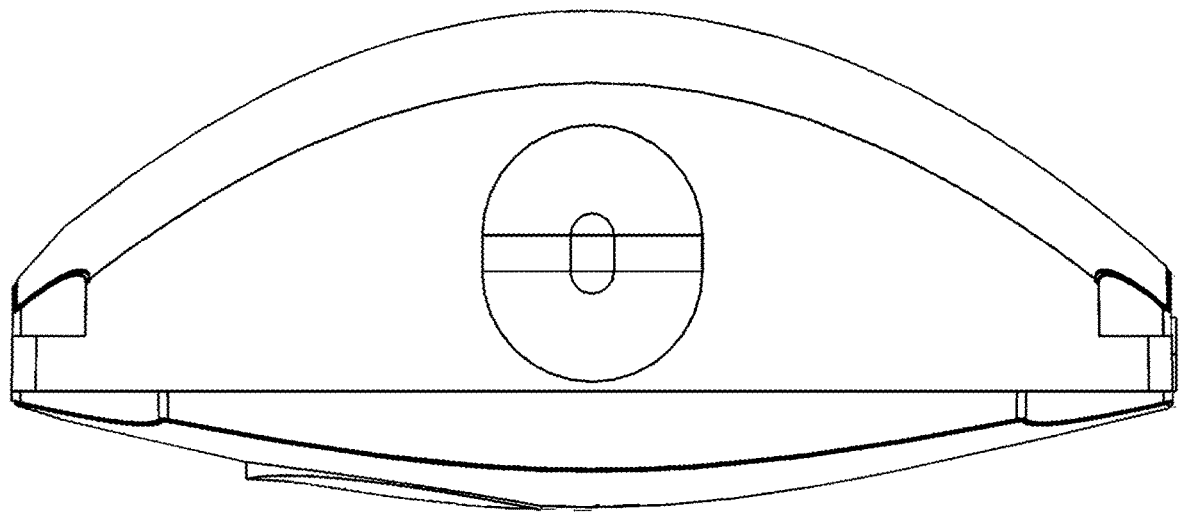
Figure 10F:
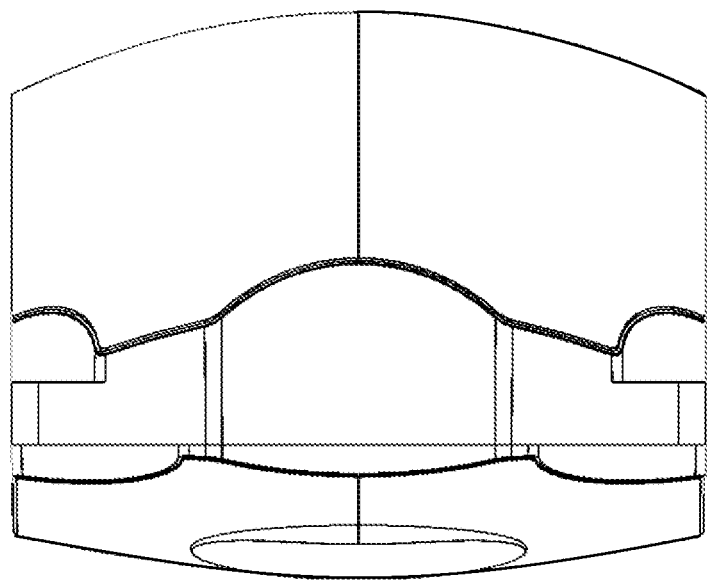
Figure 10G:
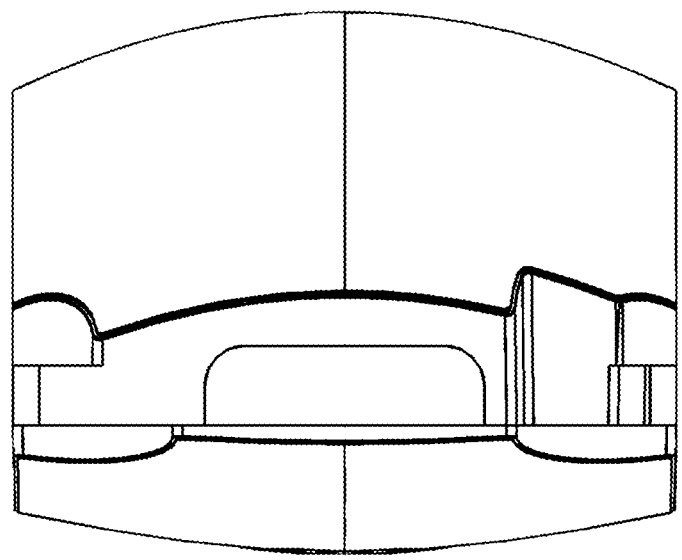

FIG. 5 and FIG. 6 depict closeups views of the isolated configuration depicted in FIG. 4 with one of the end effectors removed to view a corresponding receiver receptacle. FIG. 7A depicts a top view and FIG. 7B and FIG. 8 depict cross-section views of the configuration depicted in FIG. 5.

In the depicted example, the receiver receptacle 140 of the lens body 105 is configured as a conical frustum elongated in the Z axis direction. As depicted, the receiver receptacle 140 is configured with a cross-sectional geometry including two half-circles. The two half-circles are mirrored about a mirror plane parallel to the X-Y plane (e.g., in FIG. 5, the half-circles are mirrored substantially about the cross-section line 7B, which lies substantially in the mirror plane). The half-circles are connected by two line segments having a length 505. The line segments are substantially parallel to one another. The line segments are substantially parallel to the Z axis. A cross-sectional area of the receiver receptacle 140 is substantially monotonically decreasing from the corresponding face of the lens body 105 towards the center of the lens body 105 in the Y axis direction.

The receiver receptacles 140 have a width 605 (extending in the plane $P_L$ in a direction along the axis XL) and a height 610. For example, the width 605 defines a maximum width of the receiver receptacles 140. The width 605 is the distance between the parallel line segments. The height 610 defines a maximum height of the receiver receptacles 140. The height 610 defines is greater than the width 605 by the length 505. The length 505 in a $Z_L$ axis (orthogonal to the $P_L$) of the corresponding engagement surface 141 may, for example, define a degree of freedom of the lens body 105 relative to the opposing end effectors 130 when the distal engagement surfaces 135 engage the corresponding engagement surfaces 141.

The elongated conical frustum shape of the receiver receptacles 140 is bounded by the corresponding face of the lens body 105 and by an inner plane substantially parallel to the face, defining a length 805 of the elongated conical frustum along the $Y_L$. In the depicted example, the inner plane passes through an inner surface 615 of the receiver receptacle 140.

As depicted at least in FIG. 7B and FIG. 8, the distal engagement surface 135 is substantially configured as a conical frustum. The distal engagement surface 135 has an outer (e.g., maximum) diameter 810. A length of the distal engagement surface 135 along the $A_\theta$ axis may, for example, be substantially equal to the length 805. An angle of the distal engagement surface 135 relative to the $A_\theta$ may, as depicted, be substantially equal to an angle of the corresponding engagement surface 141 relative to the $A_\theta$.

When the conical frustum defining the distal engagement surface 135 engages the corresponding engagement surface 141 defined by the elongated portion of the elongated conical frustum of the corresponding receiver receptacle 140, the opposing end effectors 130 and the corresponding receiver receptacles 140 may each engage along two tangent lines in the plane $P_E$. The length 505 of the corresponding engagement surface 141 may, for example, provide a range of adjustment in the Z axis (e.g., the $Z_L$ axis) of the lens body 105 relative to the opposing end effectors 130.

FIG. 9A, FIG. 9B, FIG. 9C, FIG. 9D, FIG. 9E, FIG. 9F, and FIG. 9G depict an exemplary end effector. For example, the depicted end effector may be a first of a pair of opposing end effectors (e.g., as disclosed at least with reference to FIGS. 1-8). A second of the pair of opposing end effectors may, for example, be (substantially) a mirror image of the depicted end effector.

FIG. 10A, FIG. 10B, FIG. 10C, FIG. 10D, FIG. 10E, FIG. 10F, and FIG. 10G depict an exemplary lens body. The depicted lens body may, for example, be the lens body disclosed at least with reference to FIGS. 1-8.

Although various embodiments have been described with reference to the figures, other embodiments are possible. For example, in some embodiments an X-Y positioning plane of opposing end effectors (e.g., $P_E$) may be positioned such that, when the end effectors engage the lens body, an engagement surface of the lens body is lifted slightly (e.g., microns, less than ⅛ inch, less than 0.1 inch, less than 0.05 inch, less than 0.01 inch) above a receiving surface.

In some embodiments conical engagement surfaces may be configured such that engagement of the end effectors in corresponding receiver receptacles centers the lens body along an axis passing through the end effectors (e.g., $A_\theta$). For example, the distal engagement surface 135 and the corresponding engagement surface 141 may be configured to self-center the lens body 105 in the X-Y plane relative to the opposing end effectors 130.

In some embodiments a housing may include a circuit board. For example, a lens alignment system may be configured to position the lens body over an emitter and/or receiver element on a circuit board.

In some embodiments a lens body may be coupled to a housing (e.g., after positioning) by a dispensing element (e.g., needle) dropping an adhesive (e.g., liquid) at one or more target points. For example, the adhesive may flow between an engagement surface (e.g., engagement surface 145) and a receiving surface (e.g., receiving surface 150). The adhesive may cure (e.g., by photopolymerization).

Various embodiments may advantageously reduce labor requirements. For example, complimenting engagement surfaces (e.g., corresponding engagement surface 141, distal engagement surface 135) may be configured to auto-align the lens body along an axis (e.g., $A_\theta$). A position of the lens body may, for example, be known based on the auto-alignment. Accordingly, various embodiments may advantageously reduce or eliminate requirements of an operator biasing a lens body to a specific corner. Various embodiments may advantageously eliminate a requirement of force feedback to avoid overdriving an alignment machine (e.g., because the position of the lens body is known based on monitoring a (commanded) position of the opposing end effectors 130). Some embodiments may advantageously reduce uncertainty in a measuring system (e.g., of a position of the lens body relative to a mounting surface). Various embodiments may advantageously increase speed of alignment of a lens body relative to a mounting surface (e.g., of a housing).

In some embodiments, multiple pairs of opposing faces may be provided on a lens body. In some embodiments, opposing faces may be along a longitudinal axis of a lens body. A given pair of opposing faces may, for example, be provided with multiple receiver receptacles. In some embodiments (e.g., as disclosed at least with reference to FIGS. 1-8 and 10A-10G), a receiver receptacle may be centered on a corresponding face in at least one dimension (e.g., longitudinal, lateral, height). The receiver receptacle may, for example, be off-center in at least one dimension.

In some embodiments each end effector may be provided with multiple engagement surfaces. For example, multiple engagement surfaces of an end effector may be configured to align with multiple corresponding receiver receptacles of a lens body face. In some embodiments, at least one of multiple engagement surfaces of an end effector may be (selectively) engaged with at least one corresponding receiver receptacle of a lens body.

In various embodiments the housing may, for example, be made of a commodity plastic. The lens alignment system may, for example, allow for self-adjustment of the lens body to account for manufacturing variability in the housing and/or the lens body (e.g., by the degree(s) of freedom such as θ and/or Z). Accordingly, various embodiments may advantageously reduce manufacturing costs of lens body mounting elements (e.g., the housing 110 and/or the receiving surface 150).

In some embodiments the end effectors may, for example, be configured to reduce friction between engagement surfaces of the end effectors and the lens body. For example, the distal engagement surface 135 may include (poly)tetrafluoroethylene. The distal engagement surface 135 may, for example, include oil-impregnated brass. In some embodiments the distal engagement surface 135 may, for example, be coated (e.g., permanently, semi-permanently, temporarily) to reduce stick-slip between the distal engagement surface 135 and the corresponding engagement surface 141. In some embodiments the lens body may, for example, include acrylic (e.g., to achieve a desired index of refraction).

In some embodiments the end effectors may, for example, be controlled by pneumatic actuators. The end effectors may, for example, be controlled by rotary actuators (e.g., via leadscrews, via ballscrews). In some embodiments, the end effectors may be operably coupled to at least one rotary (electric) motor. The motor(s) may, for example, be configured as a servo motor. The motor may, for example, be operated in a torque control mode such that a maximum moment is applied to the end effectors. The end effector may, for example, have a known weight (e.g., corresponding to a known moment relative to the motor). The motor may, for example, apply a moment to the end effector just less than (e.g., 1.99 ft-lbs when the effector applies two ft-lbs of moment to the motor).

Some embodiments may, for example, detect contact of the end effectors with the lens body. The contact may, for example, be determined by torque sensing in an actuator operably coupled to the effector). The contact may, for example, be determined by a distance measurement sensor. The contact may, for example, be determined by force feedback. After detecting contact, some systems may be configured to retract the end effectors slightly (e.g., to reduce a force of contact). Some systems may, for example, advance the end effectors slightly (e.g., to achieve a minimum force of contact with the lens body).

In various embodiments a position of the lens body may, for example, be monitored by a distance sensor. For example, a laser distance sensor(s) may monitor placement of the lens body.

In some embodiments the receiver receptacles may at least partially protrude from a face of the lens. In various embodiments the end effectors may be provided with receiver receptacles. An engagement surface of the lens may, for example, be configured as a conical frustum. An engagement surface of the end effector may, for example, be configured as an elongated conical frustum configured to receive the lens engagement surface. Some such embodiments may, for example, advantageously avoid interference of an inwardly protruding receiver receptacle with an optical field (e.g., of an emitter and/or receiver).

In some embodiments the lens body may not have a receiver receptacle. For example, in some embodiments the lens body may be substantially flat. An articulated engagement module may, for example, be provided on each end effector. The end effector may, for example, be provided with an engagement module having an engagement surface configured to engage a lens face of the lens body (e.g., by a gripping pad). The engagement module may, for example, be coupled to the end effector by a ball joint. The ball joint may, for example, provide a rotational degree of freedom (e.g., θ) of the engagement module relative to the end effector. The ball joint may, for example, provide a linear degree of freedom (e.g., Z) of the engagement module relative to the end effector in a direction substantially orthogonal to a plane of engagement of the lens body (e.g., a plane containing the engagement surface 145). Some such embodiments may, for example, advantageously avoid interference of an inwardly protruding receiver receptacle with an optical field (e.g., of an emitter and/or receiver). Various such embodiments may, for example, reduce manufacturing costs of a lens body.

In some embodiments an engagement feature of the lens body may, for example, be configured as a cavity in the lens body (e.g., a blind cavity, an aperture). The cavity may, for example, define an engagement boundary (e.g., a boundary of an aperture). A distal engagement surface of the end effector may be configured to engage the engagement boundary. The engagement boundary may, for example, provide a rotational degree of freedom (e.g., θ) relative to the end effector. The engagement boundary may, for example, provide a linear degree of freedom (e.g., Z) relative to the end effector.

In some embodiments a receiver receptacle may be provided in an alignment module. The alignment module may, for example, releasably couple to a lens body. For example, the alignment module may be provided with engagement features configured to releasably engage mating engagement features of the lens body. The mating engagement features may, for example, align the alignment module relative to the lens body. The end effectors may, for example, be configured to engage the receiver receptacles of the alignment module. Some such embodiments may, for example, advantageously avoid interference of an inwardly protruding receiver receptacle with an optical field (e.g., of an emitter and/or receiver). Various such embodiments may, for example, reduce manufacturing costs of a lens body.

In an exemplary aspect, a lens alignment system may include opposing end effectors configured to control a position of a rigid lens body with respect to a first plane by engaging, with each of the end effectors, a corresponding receptacle on respective opposite faces of the lens body. Each of the end effectors may frictionally contact each of the corresponding receptacles within a respective portion of each of at least two contact regions that, during the engagement, lie on opposite sides of an axis of rotation that extends between the end effectors, such that, in response to at least a predetermined minimum net moment applied to the lens body, the lens body is rotatable about the axis of rotation. Rotation of the lens body about the axis of rotation may impart a change in a location of each of the respective portions within each of the respective contact regions.

Rotation of the lens body about the axis of rotation may be induced in response to a moment arm corresponding to contact between the lens body and a receiving surface.

Each of the at least two contact regions may have a width about a second axis. The second axis, during the engagement, may be substantially orthogonal to the axis of rotation and substantially parallel to the first plane. In response to at least a predetermined minimum force applied to the lens body in a direction substantially orthogonal to the first plane, the lens body may float in a direction orthogonal to the first plane according to interaction of the lens body with a receiving surface.

In an exemplary aspect, a lens alignment system may include opposing end effectors configured to control a position of a rigid lens body with respect to a first plane by engaging, with each of the end effectors, a corresponding receptacle on respective opposite faces of the lens body. Each of the end effectors may frictionally contact each of the corresponding receptacles within a respective portion of each of at least two contact regions that, during the engagement, lie on opposite sides of an axis of rotation that extends between the end effectors, such that, in response to at least a predetermined minimum net moment applied to the lens body, the lens body is rotatable about the axis of rotation.

Rotation of the lens body about the axis of rotation may impart a change in a location of each of the respective portions within each of the respective contact regions.

Rotation of the lens body about the axis of rotation may be induced in response to a moment arm corresponding to contact between the lens body and a receiving surface.

Each of the at least two contact regions may have a width about a second axis. The second axis, during the engagement, may be substantially orthogonal to the axis of rotation and substantially parallel to the first plane. In response to at least a predetermined minimum force applied to the lens body in a direction substantially orthogonal to the first plane, the lens body may float in a direction orthogonal to the first plane according to interaction of the lens body with a receiving surface. The receiving surface may be at least a portion of a housing.

The lens alignment system may further include at least one actuation module operably coupled to the end effectors. The at least one actuation module may be configured to operate the end effectors such that, during the engagement, a frictional force component of interaction between the lens body and a receiving surface is less than a predetermined maximum friction level.

The corresponding receptacles may each extend into the lens body from the corresponding face of the lens body.

A distal engagement surface of each end effector may be configured to engage the contact portion. The distal engagement surface may have a substantially circular cross-section relative to the axis of rotation. The distal engagement surface may be bounded by a conical frustum. A radius of the cross-section may decrease substantially monotonically in a distal direction along the axis of rotation relative to the corresponding end effector.

A cross-section of each of the corresponding receptacles relative to the axis of rotation may be defined by a cross-section comprising two half-circles mirrored about a plane. The plane may be substantially parallel to the first plane during the engagement. The two half-circles may be connected by two substantially parallel line segments. The line segments may be separated by a distance equal to a diameter of the half-circles. The line segments may be each substantially tangential to both of the half-circles. The line segments may be substantially orthogonal to the first plane during the engagement.

Although an exemplary system has been described with reference to the figures, other implementations may be deployed in other industrial, scientific, medical, commercial, and/or residential applications.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A lens alignment system comprising:
   opposing end effectors configured to control a position of a rigid lens body with respect to a first plane by engaging, with each of the end effectors, a corresponding receptacle on respective opposite faces of the lens body,
   wherein each of the end effectors frictionally contacts each of the corresponding receptacles within a respective portion of each of at least two contact regions that, during the engagement, lie on opposite sides of an axis of rotation that extends between the end effectors,
   such that, in response to at least a predetermined minimum net moment applied to the lens body, the lens body is rotatable about the axis of rotation, and,
   wherein rotation of the lens body about the axis of rotation imparts a change in a location of each of the respective portions within each of the respective contact regions.

2. The system of claim 1, wherein rotation of the lens body about the axis of rotation is induced in response to a moment arm corresponding to contact between the lens body and a receiving surface.

3. The system of claim 1, wherein:
   each of the at least two contact regions has a width about a second axis, the second axis, during the engagement, being substantially orthogonal to the axis of rotation and substantially parallel to the first plane,
   such that, in response to at least a predetermined minimum force applied to the lens body in a direction substantially orthogonal to the first plane, the lens body can float in a direction orthogonal to the first plane according to interaction of the lens body with a receiving surface.

4. A lens alignment system comprising:
   opposing end effectors configured to control a position of a rigid lens body with respect to a first plane by engaging, with each of the end effectors, a corresponding receptacle on respective opposite faces of the lens body,
   wherein each of the end effectors frictionally contacts each of the corresponding receptacles within a respective portion of each of at least two contact regions that, during the engagement, lie on opposite sides of an axis of rotation that extends between the end effectors,
   such that, in response to at least a predetermined minimum net moment applied to the lens body, the lens body is rotatable about the axis of rotation.

5. The system of claim 4, wherein rotation of the lens body about the axis of rotation imparts a change in a location of each of the respective portions within each of the respective contact regions.

6. The system of claim 4, wherein rotation of the lens body about the axis of rotation is induced in response to a moment arm corresponding to contact between the lens body and a receiving surface.

7. The system of claim 4, wherein:
   each of the at least two contact regions has a width about a second axis, the second axis, during the engagement, being substantially orthogonal to the axis of rotation and substantially parallel to the first plane,
   such that, in response to at least a predetermined minimum force applied to the lens body in a direction substantially orthogonal to the first plane, the lens body can float in a direction orthogonal to the first plane according to interaction of the lens body with a receiving surface.

8. The system of claim 7, wherein the receiving surface is at least a portion of a housing.

9. The system of claim 4, further comprising at least one actuation module operably coupled to the end effectors, the at least one actuation module configured to operate the end effectors such that, during the engagement, a frictional force component of interaction between the lens body and a receiving surface is less than a predetermined maximum friction level.

10. The system of claim 4, wherein the corresponding receptacles each extend into the lens body from the corresponding face of the lens body.

11. The system of claim 4, wherein a distal engagement surface of each end effector is configured to engage the contact portion, and,
the distal engagement surface has a substantially circular cross-section relative to the axis of rotation.

12. The system of claim 11, wherein the distal engagement surface is bounded by a conical frustum.

13. The system of claim 12, wherein a radius of the cross-section decreases substantially monotonically in a distal direction along the axis of rotation relative to the corresponding end effector.

14. The system of claim 4, wherein:
a cross-section of each of the corresponding receptacles relative to the axis of rotation is defined by a cross-section comprising two half-circles mirrored about a plane, which is substantially parallel to the first plane during the engagement,
the two half-circles are connected by two substantially parallel line segments, and,
the line segments are separated by a distance equal to a diameter of the half-circles and are each substantially tangential to both of the half-circles.

15. The system of claim 14, wherein the line segments are substantially orthogonal to the first plane during the engagement.

16. The system of claim 4, wherein each of the opposing faces is provided with a plurality of receptacles.

17. A lens alignment system comprising:
means for controlling a position of a rigid lens body with respect to a first plane by engaging a corresponding receptacle on respective opposite faces of the lens body,
wherein the means for controlling frictionally contacts each of the corresponding receptacles within a respective portion of each of at least two contact regions that, during the engagement, lie on opposite sides of an axis of rotation of the lens body relative to the means for controlling,
such that, in response to at least a predetermined minimum net moment applied to the lens body, the lens body is rotatable about the axis of rotation.

18. The system of claim 17, wherein rotation of the lens body about the axis of rotation imparts a change in a location of each of the respective portions within each of the respective contact regions.

19. The system of claim 17, wherein rotation of the lens body about the axis of rotation is induced in response to a moment arm corresponding to contact between the lens body and a receiving surface.

20. The system of claim 17, wherein:
each of the at least two contact regions has a width about a second axis, the second axis, during the engagement, being substantially orthogonal to the axis of rotation and substantially parallel to the first plane,
such that, in response to at least a predetermined minimum force applied to the lens body in a direction substantially orthogonal to the first plane, the lens body can float in a direction orthogonal to the first plane according to interaction of the lens body with a receiving surface.

* * * * *